(12) United States Patent
Yamada

(10) Patent No.: US 12,179,368 B2
(45) Date of Patent: Dec. 31, 2024

(54) ROBOT CONTROL DEVICE AND ROBOT SYSTEM

(71) Applicant: Seiko Epson Corporation, Tokyo (JP)

(72) Inventor: Yoshihito Yamada, Chino (JP)

(73) Assignee: SEIKO EPSON CORPORATION (JP)

( * ) Notice: Subject to any disclaimer, the term of this patent is extended or adjusted under 35 U.S.C. 154(b) by 289 days.

(21) Appl. No.: 17/590,923

(22) Filed: Feb. 2, 2022

(65) Prior Publication Data

US 2022/0241973 A1 Aug. 4, 2022

(30) Foreign Application Priority Data

Feb. 3, 2021 (JP) ................................. 2021-016093

(51) Int. Cl.
*B25J 9/16* (2006.01)
*B25J 9/12* (2006.01)

(52) U.S. Cl.
CPC .............. *B25J 9/1674* (2013.01); *B25J 9/126* (2013.01); *B25J 9/1653* (2013.01); *B25J 9/1664* (2013.01)

(58) Field of Classification Search
CPC ........ B25J 9/1674; B25J 9/126; B25J 9/1653; B25J 9/1664; B25J 13/088; B25J 9/1602; B25J 9/1694; G05B 2219/32194; G05B 2219/42329
USPC ........................................................ 700/245
See application file for complete search history.

(56) References Cited

U.S. PATENT DOCUMENTS

| 2009/0309531 | A1* | 12/2009 | Hamahata | ................. H02P 6/04 |
| | | | | 318/565 |
| 2016/0243710 | A1* | 8/2016 | Tagashira | ............... B25J 19/066 |
| 2016/0365771 | A1 | 12/2016 | Kokubo et al. | |
| 2018/0099422 | A1* | 4/2018 | Yoon | ...................... B25J 13/088 |
| 2018/0241283 | A1 | 8/2018 | Kokubo et al. | |
| 2019/0372506 | A1* | 12/2019 | Hashimoto | .............. G05B 9/02 |

(Continued)

FOREIGN PATENT DOCUMENTS

| JP | 2018-136708 A | 8/2018 |
| WO | 2015/133291 A1 | 9/2015 |

*Primary Examiner* — Adam R Mott
*Assistant Examiner* — Joseph Anthony Trias
(74) *Attorney, Agent, or Firm* — Harness, Dickey & Pierce, P.L.C.

(57) ABSTRACT

A robot control device that controls a robot including a driving section configured to drive an arm based on an operation command value and a first encoder section configured to output a first encoder value, the robot control device including a first command-value comparing section, a first mutual monitoring section, a second command-value comparing section, a second mutual monitoring section, and a power interrupting section. The first-command value comparing section performs comparison processing for a command value and a first encoder value and outputs a first command value comparison result. The second command-value comparing section performs comparison processing for the command value and the first encoder value and outputs a second command value comparison result. The first mutual monitoring section and the second mutual monitoring section output an interruption signal based on the first command value comparison result and the second command value comparison result.

9 Claims, 4 Drawing Sheets

(56) References Cited

U.S. PATENT DOCUMENTS

2020/0171661 A1\* 6/2020 Kinugasa ............... B25J 9/1628
2022/0168895 A1\* 6/2022 Lokhorst ................ B25J 9/1676

\* cited by examiner

ROBOT CONTROL DEVICE AND ROBOT SYSTEM

The present application is based on, and claims priority from JP Application Serial Number 2021-016093, filed Feb. 3, 2021, the disclosure of which is hereby incorporated by reference herein in its entirety.

BACKGROUND

1. Technical Field

The present disclosure relates to a robot control device and a robot system.

2. Related Art

JP-A-2018-136708 (Patent Literature 1) discloses a motor control device including an encoder that detects the operation of a motor, the motor control device including a motor control section configured to generate a command value concerning the operation of the motor, a driving section configured to supply a driving current to the motor, an interrupting section configured to interrupt transmission of a driving signal from the motor control section to the driving section, and a safety control section configured to cause the interrupting section to execute interruption processing. The motor control section generates, based on an operation command signal for driving the motor and a feedback signal from the encoder, the command value concerning the operation of the motor such that the operation of the motor follows the operation command signal.

The safety control section of the motor control device determines occurrence of a failure concerning the encoder based on a comparison result of a feedback value from the encoder and an operation command value calculated according to the operation command signal and causes the interrupting section to execute the interruption processing based on a result of the determination. With such a configuration, since the failure determination of the encoder is realized using the comparison result of the feedback value from the encoder and the operation command value, it is possible to improve safety performance of the motor control device.

When a failure occurs in the encoder, the safety control section described in Patent Literature 1 can determine the failure based on a feedback value from the encoder and interrupt transmission of a driving signal. In this way, the safety control section described in Patent Literature 1 secures safety performance requested to the motor control device. However, the motor control device described in Patent Literature 1 is based on the premise that the safety control section is sound. Therefore, when the safety control section fails, it cannot be determined whether a failure has occurred in the encoder. Even if a failure has occurred, transmission of a driving signal cannot be interrupted.

SUMMARY

A robot control device according to an application example of the present disclosure is a robot control device that controls an operation of a robot including an arm, a driving section configured to drive the arm based on an operation command value, and a first encoder section configured to detect an operation of the driving section and output a first encoder value, the robot control device including: a first arithmetic processing section including a first command-value comparing section and a first mutual monitoring section; a second arithmetic processing section including a second command-value comparing section and a second mutual monitoring section; and a power interrupting section configured to interrupt power of the driving section based on an interruption signal. The first command-value comparing section performs comparison processing for the operation command value and the first encoder value and outputs a first command value comparison result. The second command-value comparing section performs comparison processing for the operation command value and the first encoder value and outputs a second command value comparison result. The first mutual monitoring section and the second mutual monitoring section perform command value mutual monitoring processing for comparing the first command value comparison result and the second command value comparison result. The first arithmetic processing section and the second arithmetic processing section output the interruption signal based on a result of the command value mutual monitoring processing.

A robot system according to an application example of the present disclosure includes: the robot control device according to the application example of the present disclosure; and the robot.

DESCRIPTION OF EXEMPLARY EMBODIMENTS

A robot control device and a robot system according to the present disclosure are explained in detail below with reference to an embodiment shown in the accompanying drawings.

First, the robot system and the robot control device according to the embodiment are explained.

Figure 1:
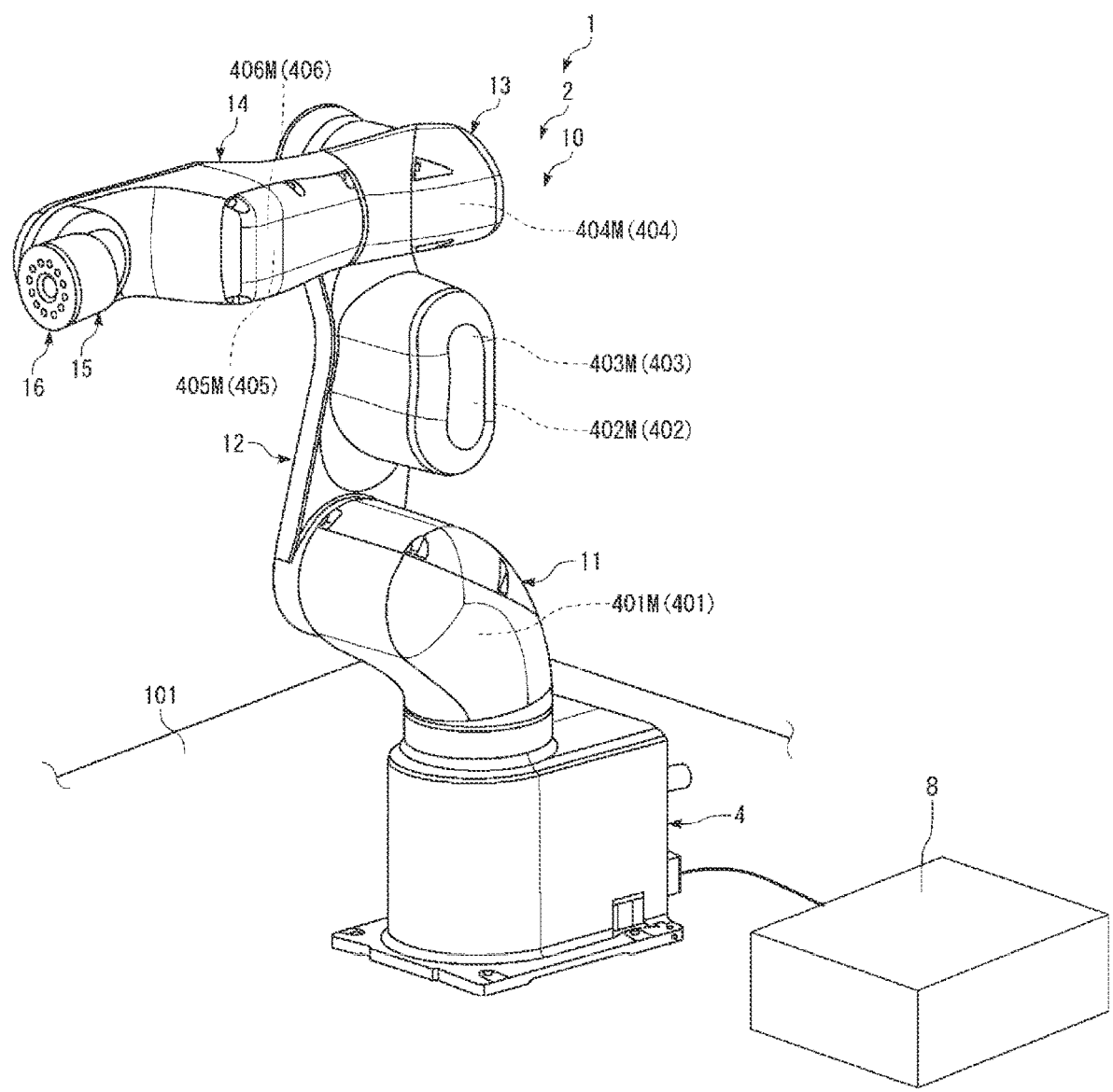
FIG. 1 is a perspective view showing a robot system according to an embodiment.
Figure 2:
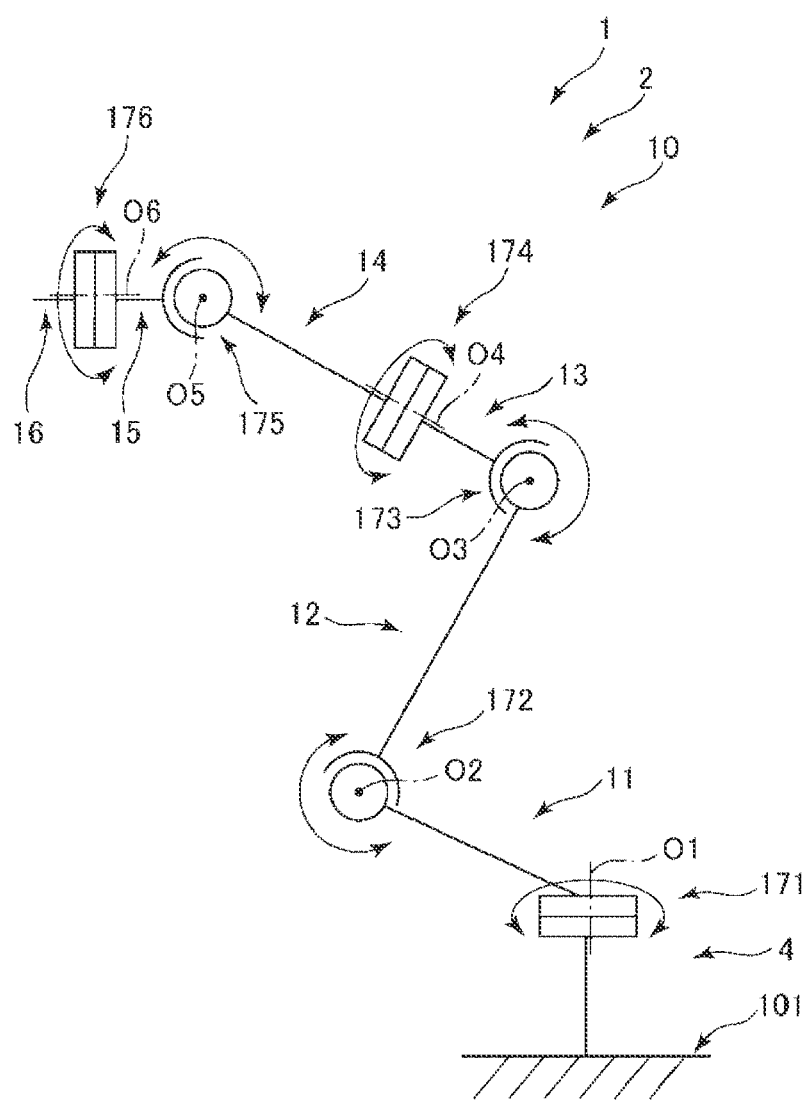
FIG. 2 is a schematic diagram of a robot shown in FIG. 1.
Figure 3:
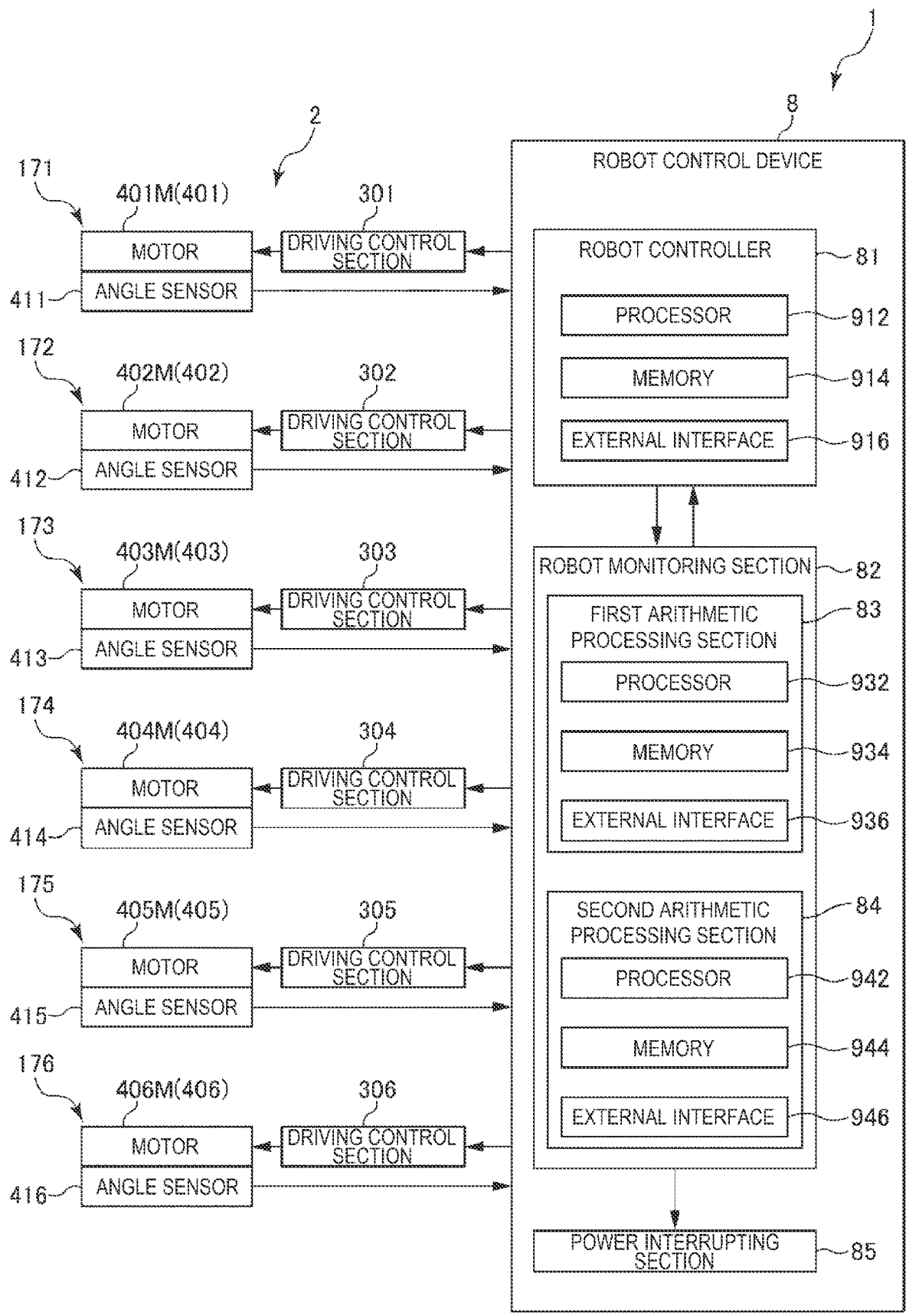
FIG. 3 is a block diagram showing a main part of the robot system shown in FIG. 1.

FIG. 1 is a perspective view showing the robot system according to the embodiment. FIG. 2 is a schematic diagram of a robot shown in FIG. 1. FIG. 3 is a block diagram showing a main part of the robot system shown in FIG. 1.

A robot system 1 shown in FIG. 1 is used in kinds of work such as conveyance, assembly, and inspection of various workpieces (target objects).

As shown in FIGS. 1 to 3, the robot system 1 includes a robot 2 including a base 4, a robot arm 10, driving sections 401 to 406, and driving control sections 301 to 306 and a robot control device 8 that controls the operation of the robot 2.

The base 4 shown in FIGS. 1 to 2 is placed on a flat floor 101. The base 4 may be placed on a wall, a ceiling, a stand, or the like rather than the floor 101.

The robot arm 10 shown in FIGS. 1 and 2 includes a first arm 11, a second arm 12, a third arm 13, a fourth arm 14, a fifth arm 15, and a sixth arm 16. A not-shown end effector can be detachably attached to the distal end of the sixth arm 16. A workpiece can be, for example, gripped by the end effector. The workpiece that is, for example, gripped by the end effector is not particularly limited. Examples of the workpiece include an electronic component and electronic equipment. In this specification, the base 4 side based on the sixth arm 16 is represented as a "proximal end side" and the sixth arm 16 side based on the base 4 is represented as a "distal end side".

The end effector is not particularly limited. Examples of the end effector include a hand that grips the workpiece and a suction head that sucks the workpiece.

A not-shown force detecting section may be provided between the sixth arm 16 and the end effector. The force detecting section detects force applied to the end effector. Examples of the force detecting section include a six-axis force sensor capable of detecting a force component (a translational force component) in an axial direction of each of three axes orthogonal to one another and a force component (a rotational force component) around each of the three axes.

Further, besides the above, the robot system 1 may include, for example, an image sensor, a depth sensor, an inertia sensor, an ultrasound sensor, a light curtain, a millimeter wave radar, and a laser scanner.

1. Robot

The robot 2 is a single-arm six-axis vertical articulated robot in which the base 4, the first arm 11, the second arm 12, the third arm 13, the fourth arm 14, the fifth arm 15, and the sixth arm 16 are coupled in this order from the proximal end side toward the distal end side. In the following explanation, the first arm 11, the second arm 12, the third arm 13, the fourth arm 14, the fifth arm 15, and the sixth arm 16 are respectively referred to as "arms" as well. The lengths of the arms 11 to 16 are respectively not particularly limited and can be set as appropriate.

The base 4 and the first arm 11 are coupled via a first joint section 171. The first arm 11 is capable of turning with respect to the base 4 with a first turning axis O1 parallel to the vertical axis as a turning center. The first joint section 171 includes, as shown in FIG. 3, the driving section 401 including a motor 401M and a not-shown speed reducer and an angle sensor 411. The first arm 11 turns according to driving of the driving section 401. The motor 401M generates a driving force for turning the first arm 11.

The first arm 11 and the second arm 12 are coupled via a second joint section 172. The second arm 12 is capable of turning with respect to the first arm 11 with a second turning axis O2 parallel to the horizontal plane as a turning center. The second joint section 172 includes, as shown in FIG. 3, the driving section 402 including a motor 402M and a not-shown speed reducer and an angle sensor 412. The second arm 12 turns according to driving of the driving section 402. The motor 402M generates a driving force for turning the second arm 12.

The second arm 12 and the third arm 13 are coupled via a third joint section 173. The third arm 13 is capable of turning with respect to the second arm 12 with a third turning axis O3 parallel to the horizontal plane as a turning center. The third joint section 173 includes, as shown in FIG. 3, the driving section 403 including a motor 403M and a not-shown speed reducer and an angle sensor 413. The third arm 13 turns according to driving of the driving section 403. The motor 403M generates a driving force for turning the third arm 13.

The third arm 13 and the fourth arm 14 are coupled via a fourth joint section 174. The fourth arm 14 is capable of turning with respect to the third arm 13 with a fourth turning axis O4 parallel to the center axis of the third arm 13 as a turning center. The fourth joint section 174 includes, as shown in FIG. 3, the driving section 404 including a motor 404M and a not-shown speed reducer and an angle sensor 414. The fourth arm 14 turns according to driving of the driving section 404. The motor 404M generates a driving force for turning the fourth arm 14.

The fourth arm 14 and the fifth arm 15 are coupled via a fifth joint section 175. The fifth arm 15 is capable of turning with respect to the fourth arm 14 with a fifth turning axis O5 orthogonal to the center axis of the fourth arm 14 as a turning center. The fifth joint section 175 includes, as shown in FIG. 3, the driving section 405 including a motor 405M and a not-shown speed reducer and an angle sensor 415. The fifth arm 15 turns according to driving of the driving section 405. The motor 405M generates a driving force for turning the fifth arm 15.

The fifth arm 15 and the sixth arm 16 are coupled via a sixth joint section 176. The sixth arm 16 is capable of turning with respect to the fifth arm 15 with a sixth turning axis O6 parallel to the center axis of the distal end portion of the fifth arm 15 as a turning center. The sixth joint section 176 includes, as shown in FIG. 3, the driving section 406 including a motor 406M and a not-shown speed reducer and an angle sensor 416. The sixth arm 16 turns according to driving of the driving section 406. The motor 406M generates a driving force for turning the sixth arm 16.

Examples of the angle sensors 411 to 416 include various encoders such as a rotary encoder. The angle sensors 411 to 416 detect rotation angles of output shafts of the motors 401M to 406M or output shafts of the speed reducers of the driving sections 401 to 406.

Examples of the motors 401M to 406M of the driving sections 401 to 406 include an AC servomotor and a DC servomotor.

Examples of the speed reducers of the driving sections 401 to 406 include a planetary gear type speed reducer configured by a plurality of gears and a wave motion speed reducer.

Each of the driving sections 401 to 406 and the angle sensors 411 to 416 is electrically coupled to the robot control device 8.

The robot control device 8 independently controls the operations of the driving sections 401 to 406 via the driving control sections 301 to 306. Specifically, the robot control device 8 controls each of operation conditions, for example, angular velocities and rotation angles of the driving sections 401 to 406 based on detection results of the angle sensors 411 to 416 and the not-shown force detecting section.

2. Configuration of the Robot Control Device

The robot control device 8 includes a robot controller 81, a robot monitoring section 82, and a power interrupting section 85.

2.1 Robot Controller

The robot controller 81 controls the operations of the driving control sections 301 to 306 and controls the operation of the robot 2.

A hardware configuration of the robot controller 81 is not particularly limited. However, in FIG. 3, the robot controller 81 includes a processor 912, a memory 914, and an external interface 916. These are communicably coupled to one another via an internal bus.

Examples of the processor 912 include a CPU (Central Processing Unit). The processor 912 executes various programs stored in the memory 914 to thereby realize functions of the robot controller 81.

The processor 912 may be an FPGA (Field-Programmable Gate Array), an ASIC (Application Specific Integrated Circuit), or the like.

Examples of the memory 914 include a volatile memory such as a RAM (Random Access Memory) and a nonvolatile memory such as a ROM (Read Only Memory). The memory 914 is not limited to a non-detachable type and may be a detachable type.

The memory 914 saves, besides the various programs, various data received by the external interface 916 and various data output from the robot 2.

Examples of the external interface 916 include a USB (Universal Serial Bus), an RS-232C interface, a wired LAN (Local Area Network), and a wireless LAN.

The robot controller 81 including the hardware configuration explained above controls the operations of the driving control sections 301 to 306 and controls the operation of the robot 2 as explained above. The robot controller 81 reflects detection results of the angle sensors 411 to 416 and detection results of the not-shown force detecting section, the image sensor, the depth sensor, and the like on the operation of the robot 2.

2.2. Robot Monitoring Section

The robot monitoring section 82 includes a first arithmetic processing section 83 and a second arithmetic processing section 84 as two arithmetic processing sections independent from each other.

A hardware configuration of the first arithmetic processing section 83 is not particularly limited. However, in FIG. 3, the first arithmetic processing section 83 includes a processor 932, a memory 934, and an external interface 936. These are communicably coupled to one another via the internal bus.

A hardware configuration of the second arithmetic processing section 84 is not particularly limited. However, in FIG. 3, the second arithmetic processing section 84 includes a processor 942, a memory 944, and an external interface 946. These are communicably coupled to one another via the internal bus.

The memories 934 and 944 and the external interfaces 936 and 946 are the same as the memory 914 and the external interface 916 explained above.

Examples of each of the processors 932 and 942 include a CPU. The processors 932 and 942 execute various programs stored in the memories 934 and 944 to thereby realize functions of the robot monitoring section 82.

Each of the processors 932 and 942 may be an FPGA, an ASIC, or the like.

The robot monitoring section 82 can further improve reliability concerning functional safety of the robot system 1 by monitoring the operation of the robot 2 independently from the robot controller 81.

2.3. Power Interrupting Section

Figure 4:
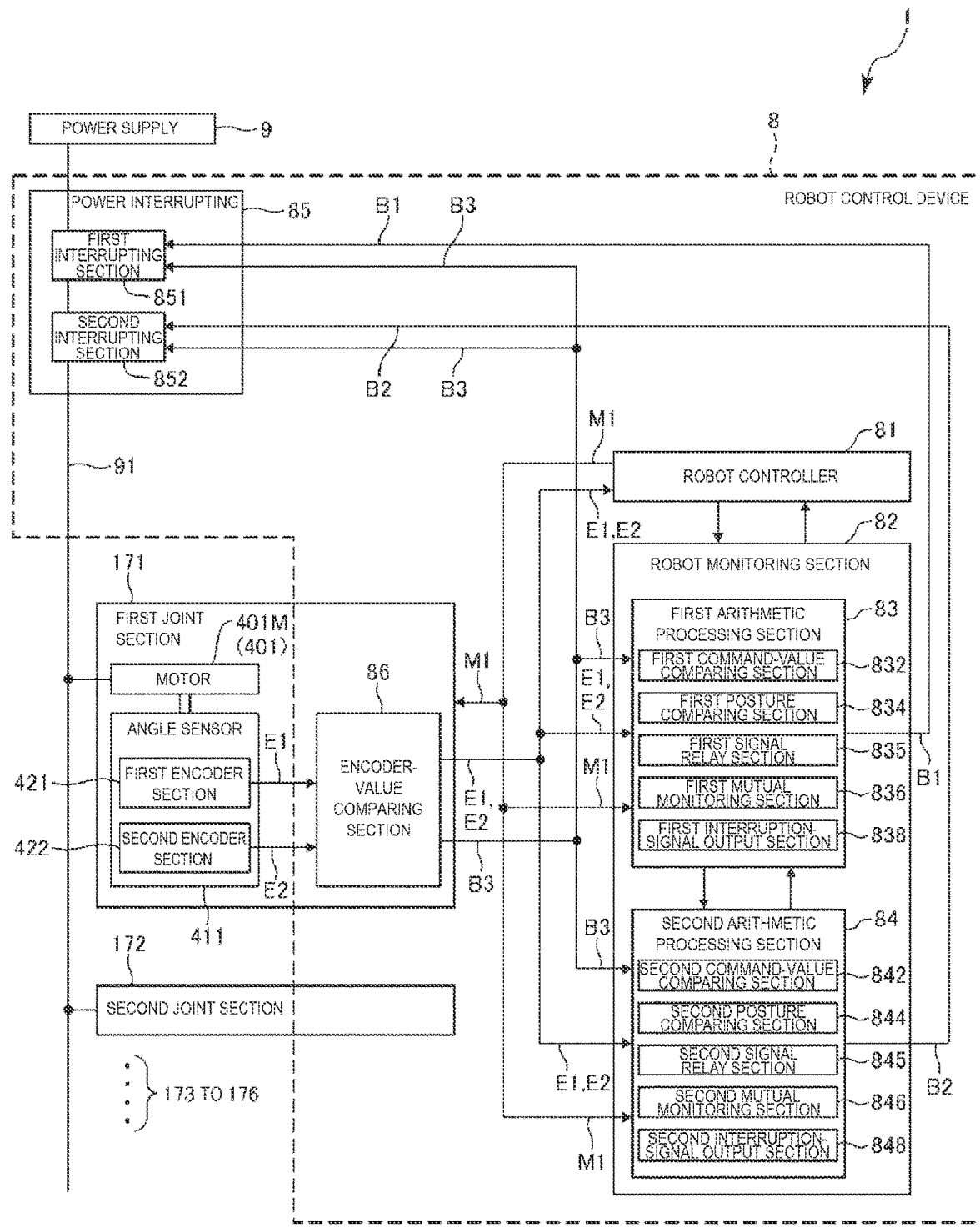
FIG. 4 is a detailed diagram of a first joint section, a robot control device, and a power interrupting section shown in FIG. 3.

FIG. 4 is a detailed diagram of the first joint section 171, the robot control device 8, and the power interrupting section 85 shown in FIG. 3. The configuration of the first joint section 171 is the same as the configuration of the second joint section 172, the third joint section 173, the fourth joint section 174, the fifth joint section 175, and the sixth joint section 176. Therefore, in the following explanation, the first joint section 171 is representatively explained with reference to FIG. 4 and the like. Explanation of the other joint sections is omitted.

The power interrupting section 85 is provided in a power supply path 91 between a power supply 9 and the driving section 401. Each of the driving sections 401 to 406 receives power supply from the power supply path 91. Therefore, the power interrupting section 85 interrupts the power supply path 91, whereby the power supply to the driving sections 401 to 406 is interrupted. It is possible to stop the operations of the driving sections 401 to 406.

The power interrupting section 85 shown in FIG. 4 includes a first interrupting section 851 and a second interrupting section 852. The first interrupting section 851 and the second interrupting section 852 are coupled to each other in series. Each of the first interrupting section 851 and the second interrupting section 852 interrupts the power supply path 91 based on an interruption signal. Therefore, if at least one of the first interrupting section 851 and the second interrupting section 852 operates, the power supply to the driving sections 401 to 406 can be interrupted. Therefore, it is possible to achieve redundancy of the power interrupting section 85.

3. Operation of the Robot Control Device 3.1. Comparison Processing for an Operation Command Value and an Encoder Value As explained above, the first joint section 171 shown in FIG. 4 includes the motor 401M and the angle sensor 411.

The angle sensor 411 shown in FIG. 4 includes a first encoder section 421 and a second encoder section 422 and is multiplexed. Each of the first encoder section 421 and the second encoder section 422 is coupled to the output shaft of the motor 401M. In this embodiment, redundancy is achieved in detection of an angular position of the output shaft of the motor 401M by multiplexing the angle sensor 411. Consequently, even when an abnormality occurs in one of the first encoder section 421 and the second encoder section 422, the angular position of the output shaft of the motor 401M can be detected based on an encoder value output from the other encoder section.

The first encoder section 421 outputs a first encoder value E1 representing the angular position of the output shaft of the motor 401M. The second encoder section 422 outputs a second encoder value E2 representing the angular position of the output shaft of the motor 401M.

The robot controller 81 receives the first encoder value E1 and the second encoder value E2 and generates an operation command value M1 based on the encoder values E1 and E2. The operation command value M1 controls the operation of the motor 401M and includes a target value of the angular position of the output shaft, that is, a target value of the encoder values E1 and E2.

Although not shown, the first joint section 171 shown in FIG. 4 includes the driving control section 301 shown in FIG. 3. The driving control section 301 receives the encoder values E1 and E2 as a feedback signal and causes the output shaft of the motor 401M to rotate in a target angular position and at target angular velocity and target torque such that the angular position of the output shaft of the motor 401M approaches the target value designated by the operation command value M1. In this way, the robot controller 81 controls the first joint section 171 to a desired angular position and, as a result, controls the posture of the first arm 11 with respect to the base 4 to a desired posture.

Each of the first arithmetic processing section 83 and the second arithmetic processing section 84 of the robot monitoring section 82 receives the operation command value M1 and the first encoder value E1 and the second encoder value E2.

The first arithmetic processing section 83 shown in FIG. 4 includes a first command-value comparing section 832. The first command-value comparing section 832 performs comparison processing for the operation command value M1 and the first encoder value E1 and outputs a first command value comparison result. The first arithmetic processing section 83 shown in FIG. 4 includes a first interruption-signal output section 838. The first interruption-signal output section 838 outputs an interruption signal B1 based on the first command value comparison result.

Specifically, the first command-value comparing section 832 performs comparison processing for the target value of the first encoder value E1 included in the operation command value M1 and a received feedback value of the first encoder value E1. When the first command value comparison result indicating that the target value and the feedback value are equal is output, the first interruption-signal output section 838 determines that the driving control section 301, the angle sensor 411, and the like are normal and does not output the interruption signal B1. On the other hand, when the first command value comparison result indicating that the target value and the feedback value are different is output, it is highly likely that an abnormality has occurred in the driving control section 301, the angle sensor 411, and the like. Since this state is not normal, the first interruption-signal output section 838 outputs the interruption signal B1.

The first interrupting section 851 receives the interruption signal B1 and interrupts the power supply path 91. Consequently, it is possible to stop the operations of the driving sections 401 to 406.

The first command-value comparing section 832 may perform comparison processing for the operation command value M1 and the second encoder value E2 or may perform comparison processing for the operation command value M1 and both of the first encoder value E1 and the second encoder value E2.

The second arithmetic processing section 84 shown in FIG. 4 includes a second command-value comparing section 842. The second command-value comparing section 842 performs comparison processing for the operation command value M1 and the first encoder value E1 and outputs a second command value comparison result. The second arithmetic processing section 84 shown in FIG. 4 includes a second interruption-signal output section 848. The second interruption-signal output section 848 outputs an interruption signal B2 based on the second command value comparison result.

Specifically, the second command-value comparing section 842 performs the same comparison processing as the comparison processing performed by the first command-value comparing section 832. When the second command value comparison result indicating that the target value and the feedback value are equal is output, the second interruption-signal output section 848 determines that the driving control section 301, the angle sensor 411, and the like are normal and does not output the interruption signal B2. On the other hand, when the second command value comparison result indicating that the target value and the feedback value are different is output, it is highly likely that an abnormality has occurred in the driving control section 301, the angle sensor 411, and the like. Since this state is not normal, the second interruption-signal output section 848 outputs the interruption signal B2.

The second interrupting section 852 receives the interruption signal B2 and interrupts the power supply path 91. Consequently, it is possible to stop the operations of the driving sections 401 to 406.

The second command-value comparing section 842 may perform comparison processing for the operation command value M1 and the second encoder value E2 or may perform comparison processing for the operation command value M1 and both of the first encoder value E1 and the second encoder value E2.

As explained above, the robot control device 8 according to this embodiment has a function of performing the comparison processing for the operation command value M1 and the first encoder value E1 or the second encoder value E2 and outputting the interruption signals B1 and B2 based on a comparison result. That is, the robot monitoring section 82 diagnoses whether the robot 2 is normally operating in response to a command from the robot controller 81 and, when an abnormality is found in the operation, stops the operation of the robot 2. Consequently, it is possible to improve safety performance of the robot system 1.

The comparison processing explained above can be performed at a control cycle of the robot monitoring section 82, for example, a several milliseconds cycle. Therefore, when some abnormality is found, it is possible to quickly grasp the abnormality and stop the operation of the robot 2.

The second interrupting section 852 only has to be provided according to necessity and may be omitted. In that case, the first interrupting section 851 only has to be configured to receive both of the interruption signals B1 and B2 and operate.

The comparison result indicating that the values are equal or the values are different can be determined considering fluctuation of the values involved in noise. After any arithmetic operation is performed on at least one value of the two values, the comparison processing may be performed on a value of the arithmetic operation. These are the same in respective kinds of comparison processing and mutual monitoring processing explained below.

3.2. Comparison Processing for a Joint Angle and a Posture and Allowable Ranges

The first arithmetic processing section 83 shown in FIG. 4 includes a first posture comparing section 834. The first posture comparing section 834 calculates a joint angle of the first joint section 171 and a posture of the robot 2 based on parameters concerning the robot 2 and the first encoder value E1. The first posture comparing section 834 performs comparison processing for the joint angle and an allowable range of the joint angle and comparison processing for the posture and an allowable range of the posture and outputs a first posture comparison result. The first interruption-signal output section 838 outputs the interruption signal B1 based on the first posture comparison result.

Examples of the parameters concerning the robot 2 include lengths (link lengths) of the arms 11 to 16 and reduction ratios of the speed reducers included in the driving sections 401 to 406. The first posture comparing section 834 calculates the joint angle of the first joint section 171 based on, for example, the reduction ratio of the speed reducer and the first encoder value E1. The first posture comparing section 834 calculates elements such as the posture of the robot 2, for example, a distal end position and a distal end direction of the sixth arm 16 and positions of the joint sections based on, for example, the link lengths and the first encoder value E1.

A manufacturer or a user of the robot system 1 only has to store the parameters concerning the robot 2 in a not-shown storing section in the first arithmetic processing section 83 in advance via the robot controller 81. The parameters may be updated as appropriate.

On the other hand, in the first arithmetic processing section 83, allowable ranges are set in advance about the joint angle of the first joint section 171 and the posture of the robot 2. The allowable range of the joint angle is a range of a joint angle allowed for the first joint section 171 when the robot system 1 is normal. The allowable range of the posture is a range of a posture allowed for the robot 2 when the robot system 1 is normal.

The manufacturer or the user of the robot system 1 only has to store these allowable ranges in the not-shown storing section in the first arithmetic processing section 83 via the robot controller 81. The allowable ranges may be updated as appropriate.

The first posture comparing section 834 performs comparison processing for the calculated joint angle and the allowable range and comparison processing for the calculated posture and the allowable range and outputs the first posture comparison result. When the first posture comparison result indicating that the calculated joint angle and the calculated posture are respectively present on the inner sides of the allowable ranges is output, the first interruption-signal output section 838 determines that the posture of the robot 2 is normal and does not output the interruption signal B1. On the other hand, when the first posture comparison result indicating that the calculated joint angle and the calculated posture are respectively present on the outer sides of the allowable ranges is output, it is highly likely that an abnormality has occurred in the posture of the robot 2. Since this state is not normal, the first interruption-signal output section 838 outputs the interruption signal B1.

The first interrupting section 851 receives the interruption signal B1 and interrupts the power supply path 91. Consequently, it is possible to stop the operations of the driving sections 401 to 406.

The first posture comparing section 834 may calculate the joint angle of the first joint section 171 and the posture of the robot 2 based on the parameters and the second encoder value E2 or may calculate the joint angle of the first joint section 171 and the posture of the robot 2 based on the parameters and both of the first encoder value E1 and the second encoder value E2.

The second arithmetic processing section 84 shown in FIG. 4 includes a second posture comparing section 844. The second posture comparing section 844 calculates the joint angle of the first joint section 171 and the posture of the robot 2 based on the parameters concerning the robot and the first encoder value E1. The second posture comparing section 844 performs comparison processing for the joint angle and the allowable range of the joint angle and comparison processing for the posture and the allowable range of the posture and outputs a second posture comparison result. The second interruption-signal output section 848 outputs the interruption signal B2 based on the second posture comparison result.

Specifically, the second posture comparing section 844 performs the same comparison processing as the comparison processing performed by the first posture comparing section 834. When the second posture comparison result indicating that the calculated joint angle and the calculated posture are respectively present on the inner sides of the allowable ranges is output, the second interruption-signal output section 848 determines that the posture of the robot 2 is normal and does not output the interruption signal B2. On the other hand, when the second posture comparison result indicating that the calculated joint angle and the calculated posture are respectively present on the outer sides of the allowable ranges is output, it is highly likely that an abnormality has occurred in the robot 2. Since this state is not normal, the second interruption-signal output section 848 outputs the interruption signal B2.

The second interrupting section 852 receives the interruption signal B2 and interrupts the power supply path 91. Consequently, it is possible to stop the operations of the driving sections 401 to 406.

The second posture comparing section 844 may calculate the joint angle of the first joint section 171 and the posture of the robot 2 based on the parameters and the second encoder value E2 or may calculate the joint angle of the first joint section 171 and the posture of the robot 2 based on the parameters and both of the first encoder value E1 and the second encoder value E2.

As explained above, the robot control device 8 according to this embodiment has a function of performing the comparison processing for the joint angle and the posture calculated from the parameters concerning the robot 2 and the first encoder value E1 or the second encoder value E2 and the allowable ranges of the joint angle and the posture set in advance and outputting the interruption signals B1 and B2 based on the comparison result. That is, the robot monitoring section 82 diagnoses, for example, whether the posture or the like of the robot 2 deviates from an allowable range designated by the user and, when deviation is found, stops the operation of the robot 2. In this way, in this embodiment, the user or the like can designate the allowable range. Therefore, it is possible to set an appropriate allowable range later taking into account the operation of the robot 2. Consequently, it is unnecessary to uniformly set a wide allowable range. It is possible to set a not-excessively wide allowable range adjusted to the operation. As a result, it is possible to improve the safety performance of the robot system 1 while reducing a frequency of outputting the interruption signals B1 and B2.

The comparison processing explained above can be performed at the control cycle of the robot monitoring section 82, for example, a several milliseconds cycle. Therefore, when some abnormality is found, it is possible to quickly grasp the abnormality and stop the operation of the robot 2.

3.3. Comparison Processing for Encoder Values

The first encoder section 421 outputs the first encoder value E1 representing the angular position of the output shaft of the motor 401M. The second encoder section 422 outputs the second encoder value E2 representing the angular position of the output shaft of the motor 401M. Therefore, the first encoder value E1 and the second encoder value E2 are usually equal.

The robot control device 8 shown in FIG. 4 includes an encoder-value comparing section 86 provided in the first joint section 171.

The encoder-value comparing section 86 performs comparison processing for the first encoder value E1 and the second encoder value E2 and acquires an encoder value comparison result. Specifically, the encoder-value comparing section 86 compares the first encoder value E1 and the second encoder value E2 and, when acquiring the encoder value comparison result indicating that the first encoder value E1 and the second encoder value E2 are equal, determines that the angle sensor 411 is normal and does not output an interruption signal B3. On the other hand, when the encoder-value comparing section 86 acquires the encoder value comparison result indicating that the first encoder value E1 and the second encoder value E2 are different, it is highly likely that an abnormality has occurred in the angle sensor 411. Since this state is not normal, the encoder-value comparing section 86 outputs the interruption signal B3.

Each of the first interrupting section 851 and the second interrupting section 852 receives the interruption signal B3 and interrupts the power supply path 91. Consequently, it is possible to stop the operations of the driving sections 401 to 406.

The first arithmetic processing section 83 shown in FIG. 4 includes a first signal relay section 835. When receiving the interruption signal B3, the first signal relay section 835 causes the first interruption-signal output section 838 to output the interruption signal B1. That is, the first signal relay section 835 has a function equivalent to relaying the interruption signal B3. As a result, the first interrupting section 851 receives the interruption signal B1 and interrupts the power supply path 91.

Further, the second arithmetic processing section 84 shown in FIG. 4 includes a second signal relay section 845. When receiving the interruption signal B3, the second signal relay section 845 causes the second interruption-signal output section 848 to output the interruption signal B2. That is, the second signal relay section 845 has a function equivalent to relaying the interruption signal B3. As a result, the second interrupting section 852 receives the interruption signal B2 and interrupts the power supply path 91.

In this way, when receiving the interruption signal B3, the robot monitoring section 82 outputs the interruption signals B1 and B2. Consequently, even when the power interrupting section 85 cannot receive the interruption signal B3 because of some trouble, it is possible to interrupt the power supply path 91 by receiving the interruption signals B1 and B2. As a result, even when the power interrupting section 85 cannot receive the interruption signal B3, when it is highly likely that an abnormality has occurred in the first encoder section 421 or the second encoder section 422, it is possible to stop the operations of the driving sections 401 to 406.

As explained above, the robot control device 8 according to this embodiment has a function of performing the comparison processing for the first encoder value E1 and the second encoder value E2 and outputting the interruption signals B1 and B2 based on the comparison result. That is, the robot monitoring section 82 diagnoses whether both of the first encoder section 421 and the second encoder section 422 are sound and, when an abnormality is found in at least one of the first encoder section 421 and the second encoder section 422, stops the operation of the robot 2. Consequently, it is possible to improve the safety performance of the robot system 1.

The robot monitoring section 82 shown in FIG. 4 receives not only the interruption signal B3 but also the first encoder value E1 and the second encoder value E2.

The first arithmetic processing section 83 performs the comparison processing for the first encoder value E1 and the second encoder value E2. When the encoder values E1 and E2 are the same, the first arithmetic processing section 83 does not cause the first interruption-signal output section 838 to output the interruption signal B1. However, when the encoder values E1 and E2 are different from each other, the first arithmetic processing section 83 causes the first interruption-signal output section 838 to output the interruption signal B1.

The second arithmetic processing section 84 also performs the comparison processing for the first encoder value E1 and the second encoder value E2. When the encoder values E1 and E2 are the same, the second arithmetic processing section 84 does not cause the second interruption-signal output section 848 to output the interruption signal B2. However, when the encoder values E1 and E2 are different from each other, the second arithmetic processing section 84 causes the second interruption-signal output section 848 to output the interruption signal B2.

Since the robot monitoring section 82 has such a function, even when an abnormality occurs in the encoder-value comparing section 86 and an encoder value comparison result cannot be acquired or when an abnormality occurs in a signal path connecting the first joint section 171 and the power interrupting section 85 and the power interrupting section 85 cannot receive the interruption signal B3, when the first encoder value E1 and the second encoder value E2 are different, the robot monitoring section 82 can output the interruption signals B1 and B2 for interrupting the power supply path 91. Consequently, even if a plurality of abnormalities such as an abnormality of the angle sensor 411 and an abnormality of the signal path of the interruption signal B3 simultaneously occur, it is possible to secure the safety performance of the robot system 1.

The comparison processing explained above can be performed at the control cycle of the robot monitoring section 82, for example, a several milliseconds cycle. Therefore, when some abnormality is found, it is possible to quickly grasp the abnormality and stop the operation of the robot 2.

When multiplexing of the angle sensor 411 is unnecessary, the second encoder section 422 may be omitted.

3.4. Mutual Monitoring Processing

The first arithmetic processing section 83 shown in FIG. 4 includes a first mutual monitoring section 836. The first mutual monitoring section 836 receives, from the second arithmetic processing section 84, the second command value comparison result output by the second command-value comparing section 842. The first mutual monitoring section 836 performs command value mutual monitoring processing for comparing the first command value comparison result output by the first command-value comparing section 832 explained above and the received second command value comparison result and outputs a command value mutual monitoring result. When the command value mutual monitoring result indicating that the first command value comparison result and the second command value comparison result are equal is output, the first arithmetic processing section 83 determines that both of the first command-value comparing section 832 and the second command-value comparing section 842 are sound. The first interruption-signal output section 838 does not output the interruption signal B1. On the other hand, when the command value mutual monitoring result indicating that the first command value comparison result and the second command value comparison result are different is output, it is highly likely that an abnormality has occurred in the first command-value comparing section 832 or the second command-value comparing section 842. Since this state is not normal, the first interruption-signal output section 838 outputs the interruption signal B1.

The first mutual monitoring section 836 receives, from the second arithmetic processing section 84, the second posture comparison signal output by the second posture comparing section 844. The first mutual monitoring section 836 performs posture mutual monitoring processing for comparing the first posture comparison result output by the first posture comparing section 834 and the received second posture comparison result and outputs a posture mutual monitoring result. When the posture mutual monitoring result indicating that the first posture comparison result and the second posture comparison result are equal is output, the first arithmetic processing section 83 determines that both of the first posture comparing section 834 and the second posture comparing section 844 are sound. The first interruption-signal output section 838 does not output the interruption signal B1. On the other hand, when the posture mutual monitoring result indicating that the first posture comparison result and the second posture comparison result are different is output, it is highly likely that an abnormality has occurred in the first posture comparing section 834 or the second posture comparing section 844. Since this state is not normal, the first interruption-signal output section 838 outputs the interruption signal B1.

The first interrupting section 851 receives the interruption signal B1 and interrupts the power supply path 91. Consequently, it is possible to stop the operations of the driving sections 401 to 406.

The second arithmetic processing section 84 shown in FIG. 4 includes a second mutual monitoring section 846. The second mutual monitoring section 846 receives, from the first arithmetic processing section 83, the first command value comparison result output by the first command-value comparing section 832. The second mutual monitoring section 846 performs command value mutual monitoring processing for comparing the second command value comparison result output by the second command-value comparing section 842 explained above and the received first command value comparison result and outputs a command value mutual monitoring result. When the command value mutual monitoring result indicating that the second command value comparison result and the first command value comparison result are equal is output, the second arithmetic processing section 84 determines that both of the second command-value comparing section 842 and the first command-value comparing section 832 are sound. The second interruption-signal output section 848 does not output the interruption signal B2. On the other hand, when the command value mutual monitoring result indicating that the second command value comparison result and the first command value comparison result are different is output, it is highly likely that an abnormality has occurred in the second command-value comparing section 842 or the first command-value comparing section 832. Since this state is not normal, the second interruption-signal output section 848 outputs the interruption signal B2.

The second mutual monitoring section 846 receives, from the first arithmetic processing section 83, the first posture comparison result output by the first posture comparing section 834. The second mutual monitoring section 846 performs posture mutual monitoring processing for comparing the second posture comparison result output by the second posture comparing section 844 and the received first posture comparison result and outputs a posture mutual monitoring result. When the posture mutual monitoring result indicating that the second posture comparison result and the first posture comparison result are equal is output, the second arithmetic processing section 84 determines that both of the second posture comparing section 844 and the first posture comparing section 834 are sound. The second interruption-signal output section 848 does not output the interruption signal B1. On the other hand, when the posture mutual monitoring result indicating that the second posture comparison result and the first posture comparison result are different is output, it is highly likely that an abnormality has occurred in the second posture comparing section 844 or the first posture comparing section 834. Since this state is not normal, the second interruption-signal output section 848 outputs the interruption signal B2.

The second interrupting section 852 receives the interruption signal B2 and interrupts the power supply path 91. Consequently, it is possible to stop the operations of the driving sections 401 to 406.

As explained above, the robot control device 8 according to this embodiment has a function of performing the mutual monitoring processing for comparing the processing result by the first arithmetic processing section and the processing result by the second arithmetic processing section 84 and outputting the interruption signals B1 and B2 based on the mutual monitoring result. That is, the robot monitoring section 82 diagnoses whether both of the first arithmetic processing section 83 and the second arithmetic processing section 84 are sound and, when an abnormality is found in at least one of the first arithmetic processing section 83 and the second arithmetic processing section 84, stops the operation of the robot 2. Consequently, it is possible to improve the safety performance of the robot system 1.

The mutual monitoring processing explained above can be performed at the control cycle of the robot monitoring section 82, for example, a several milliseconds cycle. Therefore, when some abnormality is found, it is possible to quickly grasp the abnormality and stop the operation of the robot 2.

The robot control device 8 may have, besides the function of performing the mutual monitoring processing explained above, for example, a function of mutually monitoring the encoder value comparison result received by the first arithmetic processing section 83 and the encoder value comparison result received by the second arithmetic processing section 84. Consequently, the robot control device 8 can diagnose whether both of a signal path between the first joint section 171 and the first arithmetic processing section 83 and a signal path between the first joint section 171 and the second arithmetic processing section 84 are sound. When an abnormality is found, the robot monitoring section 82 only has to output the interruption signals B1 and B2.

As explained above, the robot control device 8 according to this embodiment is a device that controls the operation of the robot 2 including the arms 11 to 16, the driving sections 401 to 406, and the first encoder section 421. The driving sections 401 to 406 drive the arms 11 to 16 based on the operation command value M1. The first encoder section 421 detects the operation of the driving section 401 and outputs the first encoder value E1. The robot control device 8 includes the first arithmetic processing section 83, the second arithmetic processing section 84, and the power interrupting section 85. The first arithmetic processing section 83 includes the first command-value comparing section 832 and the first mutual monitoring section 836. The second arithmetic processing section 84 includes the second command-value comparing section 842 and the second mutual monitoring section 846. The first command-value comparing section 832 performs the comparison processing for the operation command value M1 and the first encoder value E1 and outputs the first command value comparison result. The second command-value comparing section 842 performs the comparison processing for the operation command value M1 and the first encoder value E1 and outputs the second command value comparison result. The first mutual monitoring section 836 and the second mutual monitoring section 846 perform the command value mutual monitoring processing for comparing the first command value comparison result and the second command value comparison result. The first arithmetic processing section 83 and the second arithmetic processing section 84 output the interruption signals B1 and B2 based on a result of the command value mutual monitoring processing. The power interrupting section 85 interrupts the power (electric power) of the driving section 401 based on the interruption signals B1 and B2.

With such a configuration, the robot monitoring section 82 included in the robot control device 8 includes the first command-value comparing section 832 and the first command-value comparing section 842 and the first mutual monitoring section 836 and the second mutual monitoring section 846. Therefore, it is possible to perform the command value mutual monitoring processing for comparing the first command value comparison result and the second command value comparison result. Therefore, even when an abnormality occurs in a part of the robot monitoring section 82, specifically, the first mutual monitoring section 836 or the second mutual monitoring section 846 or when an abnormality occurs in the first encoder section 421, the robot control device 8 can interrupt the power of the driving section 401 and stop the operation of the arm 11. Consequently, the operation of the robot 2 can be stopped when the robot monitoring section 82 is not sound. Therefore, it is possible to realize the robot system 1 having high safety performance.

In this embodiment, the first arithmetic processing section 83 outputs the interruption signal B1 based on the first command value comparison result and the second arithmetic processing section 84 outputs the interruption signal B2 based on the second command value comparison result.

With such a configuration, the robot control device 8 can not only output the interruption signals B1 and B2 based on a result of the command value mutual monitoring processing but also output the interruption signal B1 based on the first command value comparison result and output the interruption signal B2 based on the second command value comparison result. Consequently, it is possible to further improve the safety performance of the robot system 1.

The robot 2 includes the second encoder section 422 that detects the operation of the driving section 401 and outputs the second encoder value E2. The robot control device 8 according to this embodiment includes the encoder-value comparing section 86. The encoder-value comparing section 86 performs the comparison processing for the first encoder value E1 and the second encoder value E2 and outputs the interruption signal B3 based on the encoder value comparison result.

With such a configuration, the encoder-value comparing section 86 performs processing with a small load, that is, the comparison processing for the first encoder value E1 and the second encoder value E2 and outputs the interruption signal B3 based on a result of the processing. By including such an encoder-value comparing section 86, the robot control device 8 has a function of diagnosing whether both of the first encoder section 421 and the second encoder section 422 are sound and, when an abnormality is found in at least one of the first encoder section 421 and the second encoder section 422, stopping the operation of the robot 2. Since simplification of the configuration of the encoder-value comparing section 86 is easy, the encoder-value comparing section 86 has a low failure probability and can output the interruption signal B3 in a short time. Therefore, it is possible to further improve the safety performance of the robot system 1.

The first arithmetic processing section 83 and the second arithmetic processing section 84 output the interruption signals B1 and B2 based on the encoder value comparison result. Consequently, even when the power interrupting section 85 cannot receive the interruption signal B3 because of some trouble, it is possible to interrupt the power supply path 91 by receiving the interruption signals B1 and B2. As a result, even when the power interrupting section 85 cannot receive the interruption signal B3, when it is likely that an abnormality has occurred in the first encoder section 421 or the second encoder section 422, it is possible to stop the operation of the driving section 401.

The first arithmetic processing section 83 includes the first posture comparing section 834. The first posture comparing section 834 calculates the posture of the robot 2 based on the first encoder value E1. The first posture comparing section 834 performs the comparison processing for the posture of the robot 2 and the allowable range about the posture and outputs the first posture comparison result.

With such a configuration, for example, when the first posture comparison result is a result indicating that the posture of the robot 2 is present on the outer side of the allowable range, the robot control device 8 determines that an abnormality has occurred in the posture of the robot 2 and outputs the interruption signal B1. Consequently, it is possible to further improve the safety performance of the robot system 1.

The second arithmetic processing section 84 includes the second posture comparing section 844. The second posture comparing section 844 calculates the posture of the robot 2 based on the first encoder value E1. The second posture comparing section 844 performs the comparison processing for the posture of the robot 2 and the allowable range about the posture and outputs the second posture comparison result.

With such a configuration, for example, when the second posture comparison result is a result indicating that the posture of the robot 2 is present on the outer side of the allowable range, the robot control device 8 determines that an abnormality has occurred in the posture of the robot 2 and outputs the interruption signal B2. Consequently, it is possible to further improve the safety performance of the robot system 1.

The first mutual monitoring section 836 and the second mutual monitoring section 846 perform the posture mutual monitoring processing for comparing the first posture comparison result and the second posture comparison result. The first arithmetic processing section 83 and the second arithmetic processing section 84 output the interruption signals B1 and B2 based on a result of the posture mutual monitoring processing.

With such a configuration, the robot monitoring section 82 included in the robot control device 8 has a function of outputting the interruption signals B1 and B2 based on not only the result of the command value mutual monitoring processing for comparing the first command value comparison result and the second command value comparison result but also the result of the posture mutual monitoring processing for comparing the first posture comparison result and the second posture comparison result. Therefore, it is possible to achieve high functionality of the robot monitoring section 82. Even when an abnormality occurs in the first posture comparing section 834 or the second posture comparing section 844, it is possible to interrupt the power of the driving section 401 and stop the operation of the arm 11. Consequently, it is possible to further improve the safety performance of the robot system 1.

The power interrupting section 85 includes the first interrupting section 851 that interrupts the power of the driving sections 401 to 406 and the second interrupting section 852 coupled to the first interrupting section 851 in series. The first interrupting section 851 operates based on the interruption signal B1 output from the first arithmetic processing section 83. The second interrupting section 852 operates based on the interruption signal B2 output from the second arithmetic processing section 84.

With such a configuration, if at least one of the first interrupting section 851 and the second interrupting section 852 operates, it is possible to interrupt the power supply to the driving sections 401 to 406. Therefore, redundancy of the power interrupting section 85 is achieved.

The robot system 1 according to this embodiment includes the robot control device 8 and the robot 2. The robot control device 8 includes the robot monitoring section 82 including the first mutual monitoring section 836 and the second mutual monitoring section 846 having the mutual monitoring function. Therefore, it is possible to diagnose soundness of the robot monitoring section 82 by grasping an abnormality of the first mutual monitoring section 836 or the second mutual monitoring section 846. Consequently, it is possible to realize the robot system 1 having high safety performance that has a function of stopping the operation of the robot 2 when the robot monitoring section 82 is not sound.

The robot control device and the robot system according to the present disclosure are explained above with reference to the embodiment shown in the figures. However, the robot control device and the robot system according to the present disclosure are not limited to the embodiment. The components of the sections can be replaced with any components having the same functions. Any other components may be added to the robot control device and the robot system according to the embodiment.

What is claimed is:

1. A robot control device that controls an operation of a robot including a first arm, a second arm, a first joint connecting between the first and second arms, a motor configured to drive the first arm relative to the second arm based on an operation command value, and first and second encoders disposed in the first joint, the first and second encoders being configured to detect an operation of the motor and output first and second encoder values, respectively, the robot control device comprising:
   a first arithmetic processor configured to be programmed to compare between the operation command value and the first encoder value and output a first command value comparison result;
   a second arithmetic processor, different from the first arithmetic processor, configured to be programmed to compare between the operation command value and the second encoder value and output a second command value comparison result; and
   a power interrupter configured to interrupt power of the motor based on at least one of a first interruption signal and a second interruption signal, wherein
   when the first arithmetic processor is further configured to be programmed to determine that the first command value comparison result and the second command value comparison result are the same, the power interrupter does not interrupt the power of the motor based on the first interruption signal,
   when the first arithmetic processor is further configured to be programmed to determine that the first command value comparison result and the second command value comparison result are different, the power interrupter interrupts the power of the motor based on the first interruption signal,
   when the second arithmetic processor is further configured to be programmed to determine that the first command value comparison result and the second command value comparison result are the same, the power interrupter does not interrupt the power of the motor based on the second interruption signal, and
   when the second arithmetic processor is further configured to be programmed to determine that the first command value comparison result and the second command value comparison result are different, the power interrupter interrupts the power of the motor based on the second interruption signal.

2. The robot control device according to claim 1, wherein the first arithmetic processor is further configured to be programmed to output the first interruption signal based on the first command value comparison result, and the second arithmetic processor is further configured to be programmed to output the second interruption signal based on the second command value comparison result.

3. The robot control device according to claim 1, further comprising:
   an encoder value comparator configured to perform comparison processing for the first encoder value and the second encoder value and output a third interruption signal to the power interrupter based on an encoder value comparison result.

4. The robot control device according to claim 3, wherein the first and second arithmetic processors are further configured to be programmed to output the first and second interruption signals to the power interrupter, respectively, based on the encoder value comparison result.

5. The robot control device according to claim 1, wherein the first arithmetic processor is further configured to be programmed to:
   calculate a posture of the robot based on the first encoder value; and
   perform comparison processing for the calculated posture and an allowable range about the posture and output a first posture comparison result.

6. The robot control device according to claim 5, wherein the second arithmetic processor is further configured to be programmed to:
   calculate a posture of the robot based on the first encoder value; and
   perform comparison processing for the calculated posture and an allowable range about the posture and output a second posture comparison result.

7. The robot control device according to claim 6, wherein the first and second arithmetic processors are further configured to be programmed to:
perform posture mutual monitoring processing for comparing the first posture comparison result and the second posture comparison result; and
output the first and second interruption signals to the power interrupter, respectively, based on a result of the posture mutual monitoring processing.

8. The robot control device according to claim 1, wherein the power interrupter includes a first interrupting section configured to interrupt the power of the motor and a second interrupting section coupled to the first interrupting section in series,
the first interrupting section operates based on the first interruption signal output from the first arithmetic processor, and
the second interrupting section operates based on the second interruption signal output from the second arithmetic processor.

9. A robot system comprising:
the robot control device according to claim 1; and
the robot.

* * * * *